United States Patent Office 2,802,830
Patented Aug. 13, 1957

2,802,830

PHTHALIDES

Donald D. Wheeler and David C. Young, Midland, Mich., assignors to The Dow Chemical Company, Midland, Mich., a corporation of Delaware No Drawing. Application April 30, 1956,
Serial No. 581,289

4 Claims. (Cl. 260—343.3)

This invention is concerned with phthalides having the formula

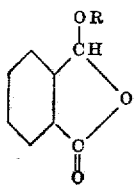

In this and succeeding formulae, R represents a radical containing 3 to 4 carbon atoms, inclusive, and selected from the group consisting of alkenyl and alkynyl. This invention also includes a method for preparing these compounds. These novel compounds are amber colored oils soluble in many organic solvents such as benzene, toluene and acetone and substantially insoluble in water. They have utility as microbicides and are adapted to be employed for the control of bacterial and fungal organisms.

These phthalides may be prepared by causing phthalaldehydic acid to react with an appropriate hydroxy compound having the formula, ROH, to produce the desired phthalide and water of reaction. The terms "Phthalaldehydic acid" and "3 - hydroxyphthalide" refer to a compound having the structure

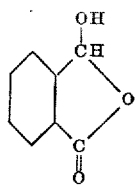

Phthalaldehydic acid is often represented in the literature as having the structure

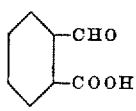

However, the acid employed in this invention and prepared as hereinafter described exists almost entirely in the closed ring 3-hydroxyphthalide structure as observed from a study of its infrared absorption spectrum. Infrared data also indicate the phthalide products of the invention to have a closed ring 3-hydroxyphthalide structure with the open chain ester sometimes being formed as a by-product.

In the synthesis, good results are obtained when substantially equimolar proportions or an excess of either reactant are employed. However, phthalaldehydic acid, if used in large excess or under conditions of high temperature, may form an anhydride by-product. The reaction takes place smoothly in the temperature range of from 15° to 150° C. but a range of from 90° to 130° C. is considered preferable from a practical standpoint such as rate of reaction or convenience of operation. Solvents such as benzene and toluene may be employed as reaction medium, if desired. The product obtained may be separated from the water of reaction by vaporization of the latter.

In the preferred method of carrying out the reaction, phthalaldehydic acid and an equimolar proportion or an excess of the appropriate hydroxy compound are mixed and heated until the water of reaction begins to reflux and is then maintained at that temperature for from 0.5 to 7 hours. The solution is allowed to cool and then poured into water whereupon an insoluble oil precipitates. The water is decanted from the oil and the latter washed with warm water. The product is dissolved in benzene and the resulting solution heated to distill first any remaining water as a benzene-water ezeotrope and then to remove the solvent. The remaining oily product may be further purified, if desired, by fractional distillation under reduced pressure.

The following examples illustrate the invention but are not to be construed as limiting.

*Example 1.—3-allyloxyphthalide*

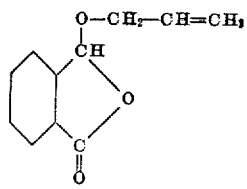

29 grams (0.5 mole) of allyl alcohol and 75 grams (0.5 mole) of phthalaldehydic acid were mixed and heated to reflux and maintained in the temperature range of from 110° to 120° C. for 3 hours. The solution was then poured into 500 milliliters of water whereupon an oil precipitated. The water was decanted therefrom and the oil again washed with water. The oil was dissolved in benzene and the benzene solution heated under reduced pressure to distill residual water as a benzene-water azeotrope and then the benzene to obtain as residue 66.5 grams of a 3-allyloxyphthalide product having a refractive index, $n_D^{20}$ of 1.5390. This amounts to a 70 percent yield.

*Example 2.—3-(2-propynyloxy)phthalide*

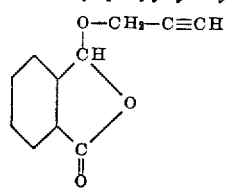

28 grams (0.5 mole) of propargyl alcohol and 75 grams (0.5 mole) of phthalaldehydic acid were mixed and heated to reflux at 128° C. for 3 hours. The reaction mixture was cooled to about 90° C. and poured into water. The water was decanted therefrom and the remaining oil again washed with water. The product was extracted with benzene and the benzene solution heated under reduced pressure to remove water and benzene and to obtain as residue 56.5 grams of an amber colored oily 3-(2-propynyloxy)phthalide product having a refractive index, $n_D^{20}$ of 1.5501. The latter amounted to a yield of 60 percent.

In a preparation carried out in a similar manner, 3-crotyloxyphthalide may be prepared by the reaction of crotyl alcohol and phthalaldehydic acid.

The products of this invention are effective as germicides and may be employed for the control of bacterial organisms. In a representative operation, a solid nutrient agar medium saturated with 3-allyloxyphthalide was streaked with *Staphylococcus aureus* and incubated at 30° C. for three days. At the end of this period, complete inhibition of growth of the test organism was observed.

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene may be heated with an aqueous solution containing from 4 to 35 percent by weight of a metal halide such as ferric chloride to obtain phthalaldehydic acid, as more fully described and claimed in a copending application of James D. Head and Owen D. Ivins, Serial Number 279,682 filed March 31, 1952.

We claim:
1. A phthalide having the formula

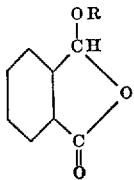

wherein R represents a radical containing 3 to 4 carbon atoms, inclusive, and selected from the group consisting of alkenyl and alkynyl.
2. 3-allyloxyphthalide.
3. 3-(2-propynyloxy)phthalide.
4. A method for preparing a phthalide having the formula

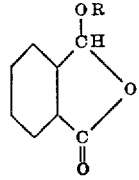

wherein R represents a radical containing 3 to 4 carbon atoms, inclusive, selected from the group consisting of alkenyl and alkynyl which comprises the step of heating phthalaldehydic acid and a hydroxy compound having the formula, ROH, wherein R is as above defined, at a temperature of from 90° to 130° C. for a time sufficient to allow completion of the reaction.

References Cited in the file of this patent

Grove: Brochem. J. 54, pp. 664–673 (1953).
Auwers et al.: Berichte 52, pp. 587, 596 (1919).
Kohlransch et al.: Berichte 77, p. 471 (1944).
Racine: Annalin, vol. 239, p. 83 (1887).

U. S. DEPARTMENT OF COMMERCE
PATENT OFFICE
CERTIFICATE OF CORRECTION

Patent No. 2,802,830                               August 13, 1957

Donald D. Wheeler et al.

It is hereby certified that error appears in the printed specification of the above numbered patent requiring correction and that the said Letters Patent should read as corrected below.

Column 1, line 39, for '"Phthalaldehydic acid"' read -- "phthalaldehydic acid" --; column 2, line 17, for "ezeotrope" read -- azeotrope --; column 3, line 16, for "1952." read -- 1952, now Patent No. 2,748,162. --.

Signed and sealed this 18th day of March 1958.

(SEAL)
Attest:

KARL H. AXLINE                                         ROBERT C. WATSON
Attesting Officer                                    Commissioner of Patents